United States Patent [19]

Groves et al.

[11] Patent Number: 5,448,824
[45] Date of Patent: Sep. 12, 1995

[54] METHOD FOR FORMING A LEAD DURING MOLDING OF AN ELECTRONIC HOUSING

[75] Inventors: Lloyd A. Groves, Galveston; Phil O. Whelchel, Tipton, both of Ind.

[73] Assignee: Delco Electronics Corporation, Kokomo, Ind.

[21] Appl. No.: 112,294

[22] Filed: Aug. 27, 1993

[51] Int. Cl.⁶ .................... H01R 43/00; H01R 43/04
[52] U.S. Cl. .............................. 29/827; 29/882; 29/883; 29/527.4; 425/112
[58] Field of Search .............. 29/827, 882, 883, 527.1, 29/527.4; 264/272.15, 272.17, 275, 277, 294–296; 425/112, 127, 129.1

[56] References Cited

U.S. PATENT DOCUMENTS

| | | | |
|---|---|---|---|
| 4,135,297 | 1/1979 | Guttenberger et al. | 29/527.1 |
| 4,965,933 | 10/1990 | Mraz et al. | 29/883 |
| 5,038,468 | 8/1991 | Wanatowicz | 264/272.15 |

OTHER PUBLICATIONS

Hastede, R. G. and Lozier, G. A. "Core Plane Terminal Forming Die," IBM Tech. Disclosure Bull., vol. 8, No. 9, Feb. 1966, p. 1208.

Primary Examiner—P. W. Echols
Attorney, Agent, or Firm—Jimmy L. Funke

[57] ABSTRACT

A molding apparatus and a molding method are provided which enable leads which project from an electronic housing, such as a housing configured to receive an accelerometer, to be formed during the molding operation in which the housing is formed. As a result, the leads used in the molding operation can be in an as-stamped, unformed condition, so as to facilitate handling and loading of the leads into the molding apparatus. In addition, because forming occurs during the molding operation, subsequent secondary forming operations are not required to achieve the desired configuration for the leads.

20 Claims, 2 Drawing Sheets

METHOD FOR FORMING A LEAD DURING MOLDING OF AN ELECTRONIC HOUSING

The present invention generally relates to the forming operations used to form the electrical leads for an electronic housing. More particularly, this invention relates to a molding process which incorporates a forming operation, wherein the leads are positioned within a mold cavity with which the electronic housing is molded, and are then formed during the molding operation, so as to facilitate the automation of the molding operation and concomitantly minimize the number of secondary operations required to manufacture the electronic housing.

BACKGROUND OF THE INVENTION

Electronic devices, such as various sensors, accelerometers and the like, are routinely enclosed within a housing to provide protection to the electronic device from the environment. Most often, such housings are formed from a polymeric material which offers low weight as well as desirable mechanical and dielectric properties. To provide electrical leads from the exterior of the housing to the accelerometer within the housing, an electrically conductive lead frame is conventionally used. A lead frame is generally a stamped metal part consisting of a number of leads, or terminals, integrally formed with a sacrificial frame that supports the leads during the forming, assembly and molding operations. Once the leads are properly molded in place with the housing, the frame is removed to prevent direct electrical contact between the leads.

To interconnect the leads with their corresponding conductors on a circuit board to which the housing is to be mounted, the leads must typically be appropriately bent toward the circuit board substrate. Generally, this forming operation occurs either before or after the molding operation. If performed before the molding operation, the lead frames are stamped and formed off-line, and then placed directly in the mold prior to injection of the plastic into the mold, with no further forming operations being required to form the leads other than the removal of the sacrificial frame.

While such an approach is generally accepted by the industry, an inherent shortcoming is the difficulty associated with the handling of the lead frames due to the irregular shape of the formed leads. Particularly, if an automated magazine feed system is to be used to facilitate the assembly and molding operation, such as with robots or other automated equipment, the shape of the formed and bent leads makes it difficult to stack the lead frames within the magazine. Inherently, the design of the magazine must be specially adapted to accommodate and feed the lead frames to the molding station. However, the irregular shape of the bent leads will still pose the potential for an increased number of misfeeds.

To avoid the above problems associated with a preformed lead frame, the leads may be formed after the molding process. While this approach generally overcomes the handling problems associated with the former method, the requirement for a secondary operation to form the leads is typically undesirable from an economic and processing standpoint, in that each additional operation requires added time, labor and equipment.

Thus, it would be desirable if a lead frame could be delivered by a magazine system to a molding station at which the lead frame is to be molded with a plastic electronic housing, without requiring the lead frame to be preformed prior to being fed to the molding station. Furthermore, it would be desirable if the electronic housing did not require a secondary operation to appropriately form its leads after the lead frame has been molded into the housing.

Accordingly, what is needed is a method and apparatus by which the required forming operation and molding operation can be merged, such that the forming operation occurs while the lead frame is secured within the mold cavity during the molding operation, so as to enable as-stamped lead frames to be fed directly to the molding station, and thereby also alleviate the requirement for a post-molding secondary operation to form the leads.

SUMMARY OF THE INVENTION

It is an object of this invention to provide a molding method in which the leads of an electronic housing to be molded, can be loaded into the mold prior to the leads undergoing a forming operation.

It is another object of this invention that such a method avoid the requirement for performing the forming operation subsequent to the molding operation.

It is a further object of this invention to provide a method and apparatus by which the leads of the electronic housing can undergo the forming operation during the molding of the housing.

It is yet another object of this invention that such a method and apparatus be uncomplicated and readily operated during the molding operation.

In accordance with a preferred embodiment of this invention, these and other objects and advantages are accomplished as follows.

According to the present invention, there is provided a molding apparatus for molding a plastic housing for an electronic device, such as an accelerometer, wherein the molding apparatus is equipped to perform a forming operation on at least one electrical lead which extends from the housing. The molding apparatus enables the housing to be molded using a lead frame which is in an as-stamped condition, in that the lead frame has a generally planar geometry. As a result, the lead frame can be readily loaded into the molding apparatus with an automated loading system. Because the molding apparatus is equipped to perform the forming operation, the housing and its molded-in leads do not require a secondary forming operation to achieve a desired configuration for the leads. Consequently, the leads can be appropriately configured to provide the necessary electrical contact between the electronic device within the housing and the substrate on which the housing is to be mounted.

Generally, the molding apparatus includes a pair of mold halves which together define a mold cavity for the housing. As is conventional, at least one of the mold halves has a sprue for introducing molten material into the mold cavity so as to form the housing. In addition, associated with at least one of the mold halves is a feature for locating at least a first portion of a lead within the mold cavity, such that a second portion of the lead projects from the mold cavity between the pair of mold halves. As is conventional, a number of such leads may be integrally formed with a frame to form a lead frame. The frame portion of the lead frame will generally be placed in the mold cavity, with each of the leads protruding from the mold cavity.

Also associated with the pair of mold halves is a device for performing a forming operation on the portion of at least one, and preferably each of the leads that extends from the mold cavity. Generally, the forming device is composed of a form punch and a mating form die which are oppositely mounted in the mold halves. Generally, the form punch and die may be individually paired with each lead to be formed, or a single form punch and die can be configured to simultaneously form a number of leads.

Accordingly, the method made possible by the molding apparatus of this invention includes integrally molding the lead frame with the housing and forming the leads during the same molding operation, such that both operations can be performed during a single operating cycle. More specifically, the method enables the forming operation to become an integral part of the molding operation, in that procedures conventional with molding processes can be utilized to also perform the desired forming operation. As a result, the molding apparatus and its operation are generally uncomplicated and can be readily incorporated within a typical molding operation employed to form housings for electronic devices.

The method includes positioning the lead frame in the mold cavity, and then sufficiently closing the mold halves so as to secure the lead frame relative to the mold halves. The lead frame is positioned such that the leads project from the mold cavity formed by the pair of mold halves. The form punch is then engaged with the portion of each lead that projects from the mold cavity such that, in conjunction with the form die, the required configuration for each lead is formed. While the mold halves are closed, the desired molding material for the housing is injected into the mold, in accordance with any of a number of molding practices. After allowing a sufficient amount of time to elapse for cooling, the pair of mold halves can then be opened so as to release the now integrally-molded housing and lead frame.

Using the molding apparatus of this invention, the molding operation by which a housing for an electronic device is molded can utilize as-stamped lead frames. Accordingly, the lead frames will generally have a planar shape, so as to facilitate the handling and loading of the lead frames by an automated magazine or other suitable automated equipment. Because the lead frames have not been previously formed to attain the required configuration, the drawbacks associated with handling a formed lead frame, such as the difficulty with which the lead frames are stacked within an automated magazine, are avoided. Accordingly, such a magazine need not be specially designed to accommodate and feed the lead frames to the molding apparatus. In addition, the potential for misfeeds can be substantially reduced.

In addition, because the leads are formed during the molding operation, a secondary forming operation subsequent to the molding operation is not required. Accordingly, the undesirable economic and processing consequences of a secondary operation, such as additional labor and equipment costs, are avoided.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings wherein.

DETAILED DESCRIPTION OF THE INVENTION

A molding apparatus and a molding method are provided which enable electrical leads which project from a housing for an electronic device, such as an accelerometer, to be formed during the molding operation in which the housing is formed. As a result, the leads used in the molding operation can be in an as-stamped, unformed condition, so as to facilitate handling and loading of the leads into the molding apparatus. In addition, because forming occurs during the molding operation, subsequent secondary forming operations are not required to achieve the desired configuration for the leads.

Figure 1:
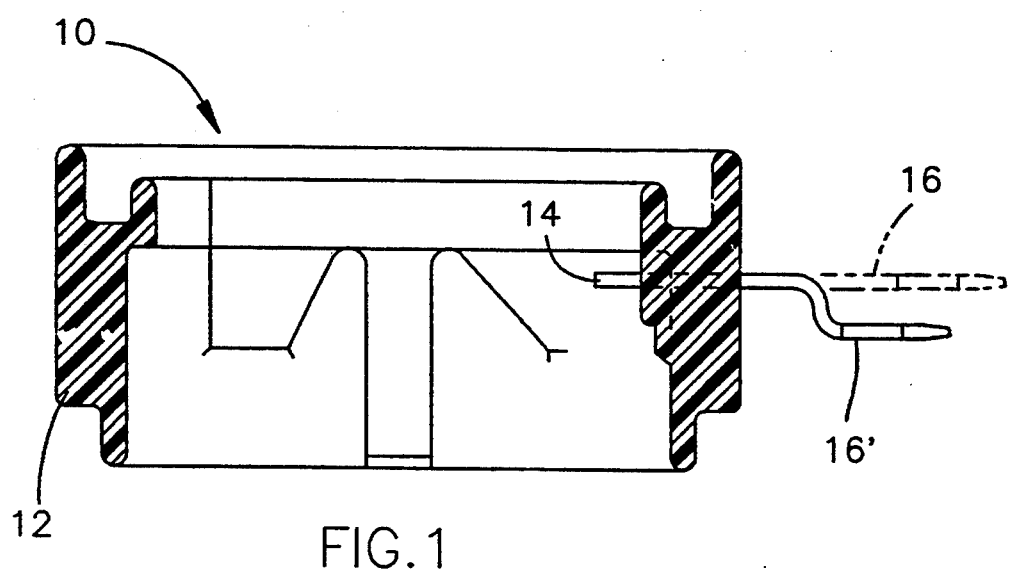
FIG. 1 shows, in cross-section, a housing which includes a lead frame from which a number of leads extend.

With reference to FIG. 1, there is shown an electronic housing 10 which consists of a plastic housing body 12 equipped with a number of electrically conductive terminals, or leads 16, one of which is shown. The leads 16 may be formed from any conventional material which is suitable for such purposes, such as a conventional tin or nickel-plated copper. The housing body 12 is formed during a molding operation in which a suitable polymeric material, most preferably a thermosetting material such as a glass-filled polyester, as well as others, is injected into a mold 18, such as that shown in FIGS. 2 and 3. For high volume operations, a number of such molds 18 will typically be fixtured to a table (not shown) by a mold fixture 36, consisting of upper and lower mold fixtures 36a and 36b, respectively. In addition, the table may be adapted to index so as to sequentially present one of the molds 18 to an injector (not shown), which injects the molten plastic into the mold 18.

As shown in FIG. 1, the leads 16 are each supported by a lead frame 14 in order to permit all of the leads 16 for a given electronic device to be simultaneously handled. As is conventional, the lead frame 14 will be removed during a later operation, after the leads 16 have been securely molded into the housing body 12 during the molding operation. For illustrative purposes, FIG. 1 also shows the appearance of the leads 16 before and after the forming operation of this invention. As formed, generally by a stamping operation, the leads 16 and the lead frame 14 together have a generally planar form. However, to allow the leads 16 to make electrical contact with the appropriate conductors (not shown) on a circuit board (not shown) to which the housing 10 is to be mounted, the leads 16 must be bent, generally to the configuration 16' shown in FIG. 1.

In the prior art, this configuration 16' would be achieved either during a pre-molding or post-molding forming operation. However, in accordance with this invention, the molding apparatus by which the housing 10 is formed is modified to incorporate a forming operation. Two embodiments for a suitable molding apparatus are represented in FIGS. 2 and 3, though it is foreseeable that other configurations could be adapted by one skilled in the art to achieve the results sought by this invention.

Figure 2:
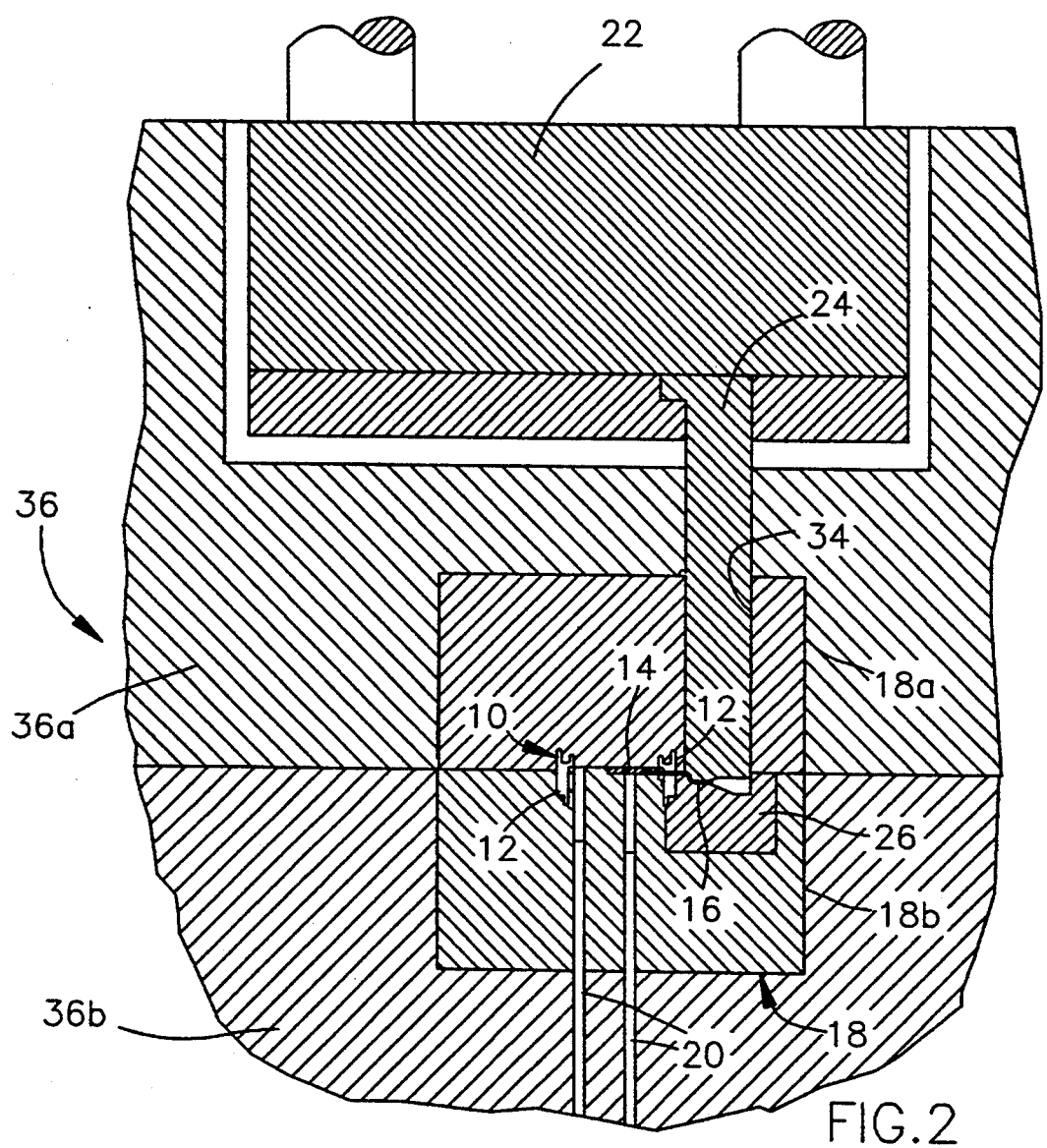
FIG. 2 is a cross-sectional view of a molding apparatus for forming the leads during the molding of the housing of FIG. 1 in accordance with a first embodiment of this invention.
Figure 3:
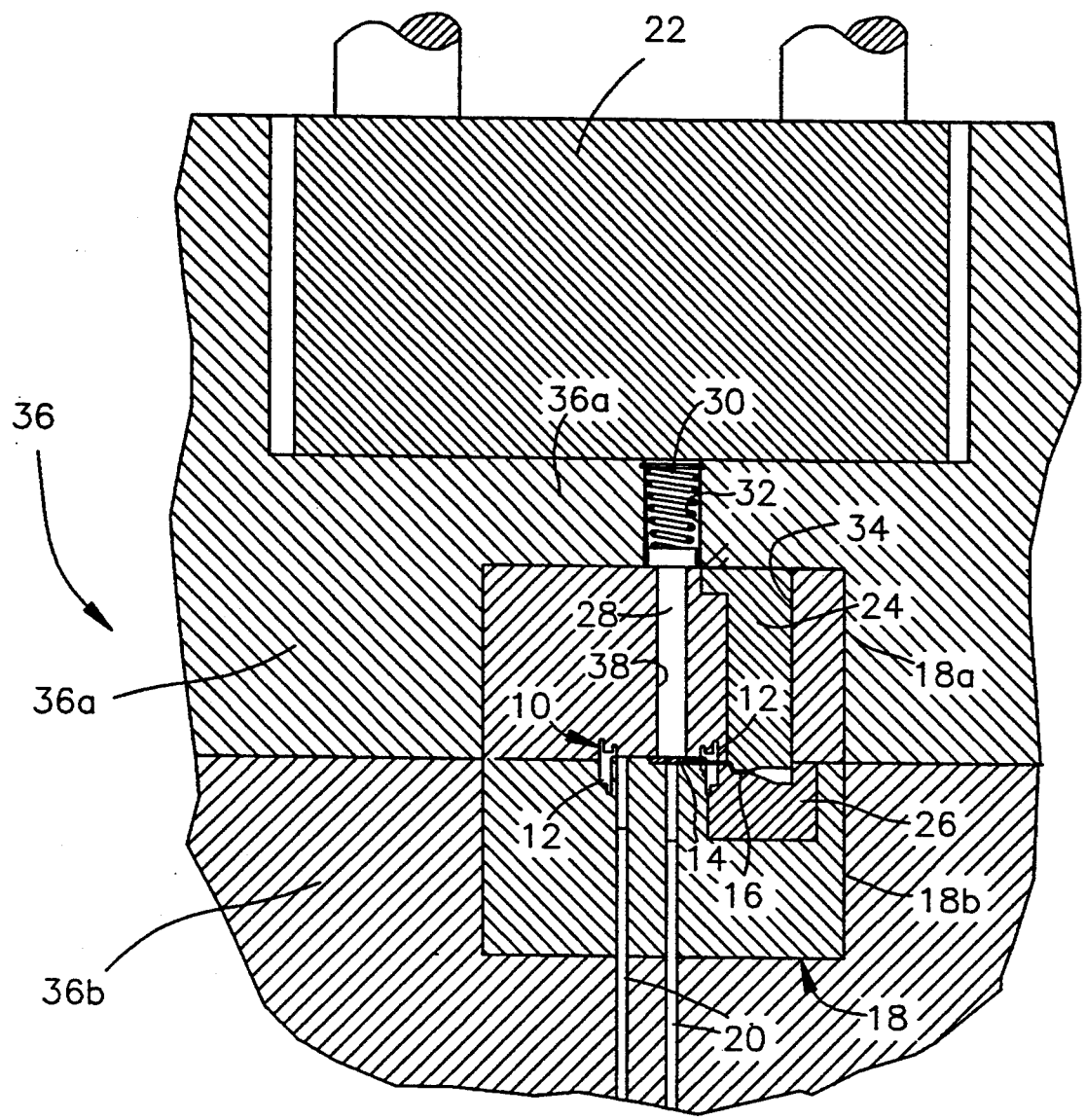
FIG. 3 is a cross-sectional view of a molding apparatus for forming the leads during the molding of the housing of FIG. 1 in accordance with a second embodiment of this invention.

With reference to FIG. 2, the molding apparatus of the first embodiment includes a mold 18, which generally consists of upper and lower mold halves 18a and 18b. Together, the mold halves 18a and 18b define a mold cavity for the housing 10. As is conventional, at least one of the mold halves includes one or more sprues 20 through which the preferred polymeric material can be introduced into the mold cavity in a molten condition to form the housing body 12. The lead frame 14 and its leads 16 are illustrated as being supported between the mold halves 18a and 18b, such that the leads 16 project from the mold cavity between the pair of mold halves 18a and 18b.

To perform the forming operation of this invention, the molding apparatus also includes a form punch 24 and form die 26, by which the leads 16 are formed to acquire the desired configuration 16' shown. In the first embodiment of FIG. 2, the form punch 24 is reciprocable relative to the upper mold half 18a and the form die 26 through a bore 34 formed in the upper mold fixture 36a and the upper mold half 18a, while the form die 26 is secured to the lower mold half 18b in any suitable manner. Generally, the form punch 24 and form die 26 may be paired to simultaneously form each of the leads 16 of the housing 10, though it is foreseeable that more than one pair of punch and dies could be utilized, with each pair being dedicated to forming one or more leads 16.

The upper end of the form punch 24 is secured to a plate 22 which is supported above the upper mold fixture 36a. The plate 22 is supported such that it can be actuated in a direction toward the upper mold fixture 36a in order to engage the form punch 24 with the one or more leads 16 and the form die 26. Numerous methods can be adopted to actuate the plate 22, including pneumatic, hydraulic and magnetic actuating devices. A primary consideration in selecting the type of actuating device employed is that the device be capable of actuating the plate 22 such that a sufficient force is generated to form the leads 16 at the end of the downward stroke of the form punch 24. Generally, a hydraulic actuating system will be most suitable for such purposes.

The method made possible by the molding apparatus described above includes integrally molding the leads 16 and the lead frame 14 with the housing body 12, as well as forming the leads 16, such that both operations can be performed substantially during a single operating cycle. As will become apparent, the forming operation becomes an integral part of the molding operation, in that procedures conventional with molding processes can be utilized to also perform the desired forming operation. As a result, the molding apparatus and its operation are generally uncomplicated and can be readily incorporated within a typical molding operation employed to form housings 10 for electronic devices.

The method made possible by the molding apparatus of this invention involves positioning the lead frame 14 on the lower mold half 18b such that the leads 16 extend outside the mold cavity. The mold halves 18a and 18b are then closed sufficiently to secure the lead frame 14 and leads 16 therebetween. The plate 22 is then actuated toward the mold 18, such that the form punch 24 engages at least one of the leads 16 and, in conjunction with the form die 26, the required configuration 16' for the lead 16 is formed.

While the mold halves 18a and 18b are closed, the desired polymeric material for the housing body 12 is injected into the mold 18 using any suitable molding device (not shown). The injection cycle can be performed prior or subsequent to the forming operation, though it is foreseeable that it may be necessary perform the operations in a particular order under some circumstances. After allowing for sufficient time for cooling, the pair of mold halves 18a and 18b are then opened so as to release the now integrally-molded housing body 12, lead frame 14 and leads 16. The lead frame 14 may be subsequently removed from the housing body 12 with any one of a number of methods, so as to leave only the leads 16 molded in the housing body 12.

The molding apparatus of the second embodiment shown in FIG. 3 is generally similar to that of the first embodiment of FIG. 2. Generally, the molding apparatus includes a mold 18 consisting of upper and lower mold halves 18a and 18b, which together define the mold cavity for the housing 10. As before, the lead frame 14 and the leads 16 are supported by the mold 18 between the mold halves 18a and 18b, such that the leads 16 project from the mold cavity.

In contrast to the embodiment of FIG. 2, the form punch 24 of the second embodiment is rigidly secured within the upper mold half 18a by the upper mold fixture 36a, such that the form punch 24 is actuated by the mating of the upper mold half 18a with the lower mold half 18b. In addition, the molding apparatus of the second embodiment incorporates a retaining pin 28 which is reciprocably received within a bore 38 formed in the upper mold half 18a above that portion of the lower mold half 18b which supports the lead frame 14. The retaining pin 28 is biased toward the lower mold half 18b by a compression spring 30 received within a recess 32 in the upper mold fixture 36a. Consequently, as the upper mold half 18a is moved into engagement with the lower mold half 18b, the retaining pin 28 will engage and stabilize the lead frame 14 with respect to the lower mold half 18b before the upper and lower mold halves 18a and 18b have fully closed. With further movement of the upper mold half 18a towards the lower mold half 18b, the form punch 24 will engage one or more of the leads 16 and, in conjunction with the form die 26, the required configuration 16' for the lead 16 will be acquired. Devices typically employed to actuate the upper mold half 18a are conventionally selected in view of the requirement that the mold halves 18a and 18b must be securely clamped together during the molding operation to resist the forces generated as the molten plastic material is injected into the mold 18. However, in that the forces necessary to form the leads 16 may be significantly higher, a device capable of generating a higher clamping force will typically be necessary to properly mate the mold halves 18a and 18b.

As before, the desired polymeric material is injected into the mold 18 after the mold halves 18a and 18b are mated. As a consequence, the forming operation will have been completed prior to the injection cycle, since the forming operation is performed with the closing of the mold halves 18a and 18b, and the injection cycle cannot commence until the mold halves 18a and 18b have closed. After allowing sufficient time for the housing body 12 to cool, the pair of mold halves 18a and 18b are opened so as to release the now integrally-molded housing body 12, lead frame 14 and lead 16. Again, the lead frame 14 is subsequently removed from the housing body 12 using a suitable method, so as to leave only the leads 16 integrally molded with the housing body 12.

Accordingly, as with the first embodiment of this invention, the molding and forming technique made possible by the molding apparatus of the second embodiment enables the leads 16 and the lead frame 14 to be integrally molded with the housing body 12, as well as enables the leads 16 to be formed during the same molding operation. In particular, the forming operation is an integral part of the molding operation, in that the forming operation relies on the conventional operation of the mold halves 18a and 18b in order to perform the desired forming operation. As a result, the molding apparatus is generally uncomplicated and can be readily incorporated within a typical molding operation employed to form a housing 10 for an electronic device.

In addition, an advantage with the molding apparatus of this invention is that the resulting molding operation utilizes as-stamped lead frames 14, instead of a preformed lead frame 14 as is typical in the prior art. Accordingly, the lead frames 14 and leads 16 can have a planar shape, which are relatively easy to handle and load into the mold 18 using an automated magazine or other suitable automated equipment. Because the leads 16 do not yet have the required configuration 16' the drawbacks associated with handling a lead frame 14 having preformed leads 16, such as the difficulty with which such lead frames 14 are stacked within and dispensed from the magazine, are avoided. Accordingly, the magazine need not be specially designed to accommodate and feed the lead frames 14 to the molding apparatus. In addition, the potential for misfeeds may be substantially reduced.

An additional advantage is that the leads 16 are formed during the molding operation, such that a secondary forming operation subsequent to the molding operation is not required. Accordingly, the undesirable economic and processing consequences of a secondary operation, such as additional time, labor and equipment costs, are avoided.

Accordingly, while our invention has been described in terms of a preferred embodiment, it is apparent that other forms could be adopted by one skilled in the art, for example by modifying the processing parameters employed, by substituting appropriate materials, or by modifying the geometry of the lead frame 14, leads 16, and/or housing body 12. Accordingly, the scope of our invention is to be limited only by the following claims.

The embodiments of the invention in which an exclusive property or privilege is claimed are defined as follows:

1. A method for forming a lead during the molding of a housing from which said lead extends, said method comprising the steps of:
   positioning a first portion of said lead within a mold cavity for said housing as defined by a pair of mold halves;
   sufficiently closing said pair of mold halves so as to secure said first portion of said lead within said mold cavity such that a second portion of said lead projects from said mold cavity and between said pair of mold halves;
   performing a forming operation on said second portion of said lead to bend said second portion of said lead into a predetermined configuration suitable for electrical connection external to said housing; and
   opening said pair of mold halves so as to release said housing and said lead, said lead being integrally molded with said housing.

2. A method as recited in claim 1 further comprising the step of injecting a polymeric material into said mold cavity after said performing step so as to form said housing.

3. A method as recited in claim 1 further comprising the step of injecting a polymeric material into said mold cavity prior to said performing step so as to form said housing.

4. A method as recited in claim 1 wherein said performing step comprises engaging said second portion of said lead with a forming member which reciprocably extends through one of said pair of mold halves.

5. A method as recited in claim 1 wherein said closing step comprises engaging said portion of said lead with a retaining member which reciprocably extends through one of said pair of mold halves.

6. A method as recited in claim 5 wherein said performing step comprises engaging said second portion of said lead with a forming member secured to one of said pair of mold halves.

7. A method for forming a plurality of leads during the molding of a housing with which said plurality of leads is molded and from which said plurality of leads extends, said method comprising the steps of:
   positioning a lead frame at least partially within a mold cavity for said housing as defined by a pair of mold halves, said lead frame being integrally formed with and supporting said plurality of leads;
   sufficiently closing said pair of mold halves so as to secure said lead frame between said pair of mold halves such that a portion of each of said plurality of leads projects from said mold cavity and between said pair of mold halves;
   performing a forming operation on said portion of at least one of said plurality of leads to bend said portion of at least one of said plurality of leads into a predetermined configuration suitable for electrical connection external to said housing; and
   opening said pair of mold halves so as to release said housing and said plurality of leads, said plurality of leads being integrally molded with said housing.

8. A method as recited in claim 7 further comprising the step of injecting a polymeric material into said mold cavity after said performing step so as to form said housing.

9. A method as recited in claim 7 further comprising the step of injecting a polymeric material into said mold cavity prior to said performing step so as to form said housing.

10. A method as recited in claim 7 wherein said performing step comprises engaging said at least one of said plurality of leads with a forming member which reciprocably extends through one of said pair of mold halves.

11. A method as recited in claim 7 wherein said closing step comprises engaging said lead frame with a retaining member which reciprocably extends through one of said pair of mold halves.

12. A method as recited in claim 11 wherein said performing step comprises engaging said at least one of said plurality of leads with a forming member secured to one of said pair of mold halves.

13. A method as recited in claim 7 wherein said performing step includes forming each of said plurality of leads.

14. An apparatus for molding a housing and forming a lead which extends from said housing, said apparatus comprising:

a pair of mold halves which together define a mold cavity for said housing;

means associated with said pair of mold halves for locating at least a first portion of said lead within said mold cavity such that a second portion of said lead projects from said mold cavity and between said pair of mold halves;

means associated with said pair of mold halves forming said second portion of said lead to bend said second portion of said lead into a predetermined configuration suitable for electrical connection external to said housing; and means formed in at least one of said pair of mold halves for introducing molten material into said mold cavity for forming said housing;

whereby said housing is molded and said lead is formed within said apparatus substantially during a single operating cycle, such that said lead is integrally molded with said housing.

15. An apparatus as recited in claim 14 wherein said forming means comprises a forming member which is reciprocably received in one of said pair of mold halves.

16. An apparatus as recited in claim 14 wherein said locating means comprises a retaining member which is reciprocably received in one of said pair of mold halves so as to engage said first portion of said lead.

17. An apparatus as recited in claim 16 wherein said forming means comprises a forming member secured to one of said pair of mold halves.

18. An apparatus as recited in claim 16 further comprising means for biasing said retaining member into engagement with said first portion of said lead.

19. An apparatus as recited in claim 14 wherein said forming means comprises means for forming each of said plurality of leads.

20. An apparatus as recited in claim 14 wherein said forming means comprises a forming punch associated with one of said pair of mold halves and a forming die associated with a second of said pair of mold halves.

* * * * *